United States Patent
Buchanan (10) Patent No.: US 10,427,579 B1
(45) Date of Patent: Oct. 1, 2019

(54) HYDRAULIC BALE TRAILER

(71) Applicant: Vernon Roger Buchanan, Pawnee, OK (US)

(72) Inventor: Vernon Roger Buchanan, Pawnee, OK (US)

(*) Notice: Subject to any disclaimer, the term of this patent is extended or adjusted under 35 U.S.C. 154(b) by 256 days.

(21) Appl. No.: 15/398,918

(22) Filed: Jan. 5, 2017

(51) Int. Cl.
*B60P 1/16* (2006.01)
*B60P 1/28* (2006.01)
*B60P 3/035* (2006.01)
*B60P 1/24* (2006.01)
*B60P 1/04* (2006.01)
*B60P 7/12* (2006.01)

(52) U.S. Cl.
CPC ............. *B60P 1/162* (2013.01); *B60P 1/04* (2013.01); *B60P 1/16* (2013.01); *B60P 1/165* (2013.01); *B60P 1/24* (2013.01); *B60P 1/286* (2013.01); *B60P 3/035* (2013.01); *B60P 7/12* (2013.01)

(58) Field of Classification Search
CPC .. B60P 1/162; B60P 1/286; B60P 7/12; B60P 1/165; B60P 1/04; B60P 1/24; B60P 3/035; B60P 1/16; A01D 90/105; A01D 90/083; A01D 90/10
USPC ........... 298/17.7, 18, 22 R, 38; 414/24.5, 25, 414/111, 470; 56/473.5, 475, 476, 480
See application file for complete search history.

(56) References Cited

U.S. PATENT DOCUMENTS

| 3,159,287 | A | | 12/1964 | Stroup |
| 3,799,612 | A | | 3/1974 | Norton et al. |
| 3,877,595 | A | | 4/1975 | Edelman |
| 3,922,036 | A | * | 11/1975 | Kalsbeck ............. A01D 90/083 298/18 |
| 4,079,996 | A | | 3/1978 | Vansickle |
| 4,092,050 | A | | 5/1978 | Sobeck |
| 4,138,159 | A | | 2/1979 | Hall |
| 5,123,800 | A | | 6/1992 | Druse, Sr. |
| 5,882,085 | A | * | 3/1999 | Pekarek ................. B60P 1/483 298/1 A |
| 6,537,008 | B1 | | 3/2003 | Haring |

FOREIGN PATENT DOCUMENTS

| DE | 8714209 | 12/1987 |
| GB | 588668 | 5/1947 |

* cited by examiner

*Primary Examiner* — Stephen T Gordon
(74) *Attorney, Agent, or Firm* — Head, Johnson, Kachigian & Wilkinson, PC (57) ABSTRACT

A hydraulic bale trailer comprising: a frame, where the frame is elongate and has a long axis; an axle caddy, where the frame is connected to the axle caddy such that the frame is capable of tilting on its long axis; a lock assembly connected to the axle caddy such that the lock assembly is capable of preventing the frame from tilting when the lock assembly is in an engaged position; and a hydraulic assembly with a first end and a second end, where the first end is connected to the frame and the second end is connected to the axle caddy and where the hydraulic assembly is capable of releasing the lock assembly from the engaged position to a disengaged position, allowing the frame to tilt.

8 Claims, 9 Drawing Sheets

FIG. 6

HYDRAULIC BALE TRAILER

BACKGROUND OF THE INVENTION

CROSS REFERENCE

Not Applicable.

FIELD OF THE INVENTION

This invention relates generally to a bale trailer, and more particularly, but not by way of limitation, to a bale trailer with a hydraulic cylinder for unlocking, dumping bales, returning the bale trailer upright, and relocking.

DESCRIPTION OF THE RELATED ART

Single inline bale trailers are often used to haul large round bales with pickups or larger vehicles. The trailer pivots on the vehicle ball and trailer hitch. A second pivot point is at an axle caddy and frame. The pivot point is usually a pin and bushing. Round bales are loaded on the pipe rails of the trailer and pushed forward using tractors or skid loaders. Most bale trailers are manual dump using manpower to dump the bales. Some bale trailers are hydraulic, but have a rigid mount, only moving as fast as the hydraulics to dump and frequently failing to dump the bales.

Based on the foregoing, it is desirable to provide a hydraulic bale trailer where the hydraulics work on the lock rather than directly on the frame.

It is further desirable for the mechanism to allow the momentum of the bales to dump rather than relying on the hydraulics.

It is further desirable for the hydraulics to assist in dumping the bales if needed.

It is further desirable for reversing the hydraulics to allow the locks to reengage.

SUMMARY OF THE INVENTION

In general, in a first aspect, the invention relates to a hydraulic bale trailer comprising: a frame, where the frame is elongate and has a long axis; an axle caddy, where the frame is connected to the axle caddy such that the frame is capable of tilting on its long axis; a lock assembly connected to the axle caddy such that the lock assembly is capable of preventing the frame from tilting when the lock assembly is in an engaged position; and a hydraulic assembly with a first end and a second end, where the first end is connected to the frame and the second end is connected to the axle caddy and where the hydraulic assembly is capable of releasing the lock assembly from the engaged position to a disengaged position, allowing the frame to tilt. The hydraulic bale trailer may further comprise a pendulum assembly, where the first end of the hydraulic assembly is connected to the frame via the pendulum assembly. The pendulum assembly may comprise: a pendulum box extending downward from the frame; and a pendulum pivotally mounted within the pendulum box such that the pendulum is capable of pivoting freely within the pendulum box along a plane lying perpendicular to the long axis of the frame, where the first end of the hydraulic assembly is pivotally connected to a distal end of the pendulum such that actuating the hydraulic assembly causes the pendulum to pivot within the pendulum box.

The hydraulic assembly may comprise: a hydraulic mount pivotally connected to the distal end of the pendulum; a piston rod connected to the hydraulic mount; and a housing mounted to the axle caddy, where the piston rod is capable of reciprocating within the housing such that extending the piston rod pushes the pendulum toward a first side of the pendulum box and retracting the piston rod pulls the pendulum toward an opposed second side of the pendulum box.

The hydraulic bale trailer may further comprise an unlock arm, where the unlock arm is elongate and comprises: a first end pivotally connected to the distal end of the pendulum and the first end of the hydraulic assembly; a center supported by a bracket extending downward from the frame such that the bracket supports the unlock arm in an upward-angled position but allows axial movement of the unlock arm through the bracket; and a second end. The unlock arm may lie in a plane perpendicular to the long axis of the frame and may be aligned with the lock assembly such that the unlock arm is capable of unlocking the unlock assembly. The lock assembly may comprise: a post extending generally upward from and pivotally connected to the axle caddy such that the post is capable of pivoting toward or away from the frame; a notch in a distal end of the post; a paddle connected to the post such that pushing the paddle pivots the post away from the frame; a lock spring with a first end connected to the post and a second end connected to the axle caddy, where the lock spring lies in a plate generally perpendicular to the long axis of the frame such that pivoting the post away from the frame stretches the lock spring; an arm extending outward from the frame toward the post; and a cross piece at a distal end of the arm, where the cross piece fits within the notch when the spring is not stretched such that the post prevents the frame from tilting when the lock assembly is in the engaged position. Pressing the paddle may pivot the post away from the frame and consequently release the cross piece from the notch, allowing the frame to tilt. The second end of the unlock arm may be positioned such that it is capable of pressing the paddle and moving the lock assembly from the engaged position to the disengaged position when the hydraulic assembly is retracted.

In a second aspect, the invention relates to the hydraulic assembly alone, which may be used with a bale trailer comprising a frame, and axle caddy, and a lock assembly.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a bale trailer 1. The bale trailer 1 may have a frame 2 and may be connected via a ball and hitch connection 3 to a vehicle 4, such as a pickup or other large vehicle. The frame 2 may pivot at the ball and hitch connection 3 and at a second pivot point 30 with pivot pin 31 at the axle caddy 5. The frame 2 may be a pipe frame, and/or may be made of pipe, box tube, knobbing, or any other desired structure or material.

Figure 1:
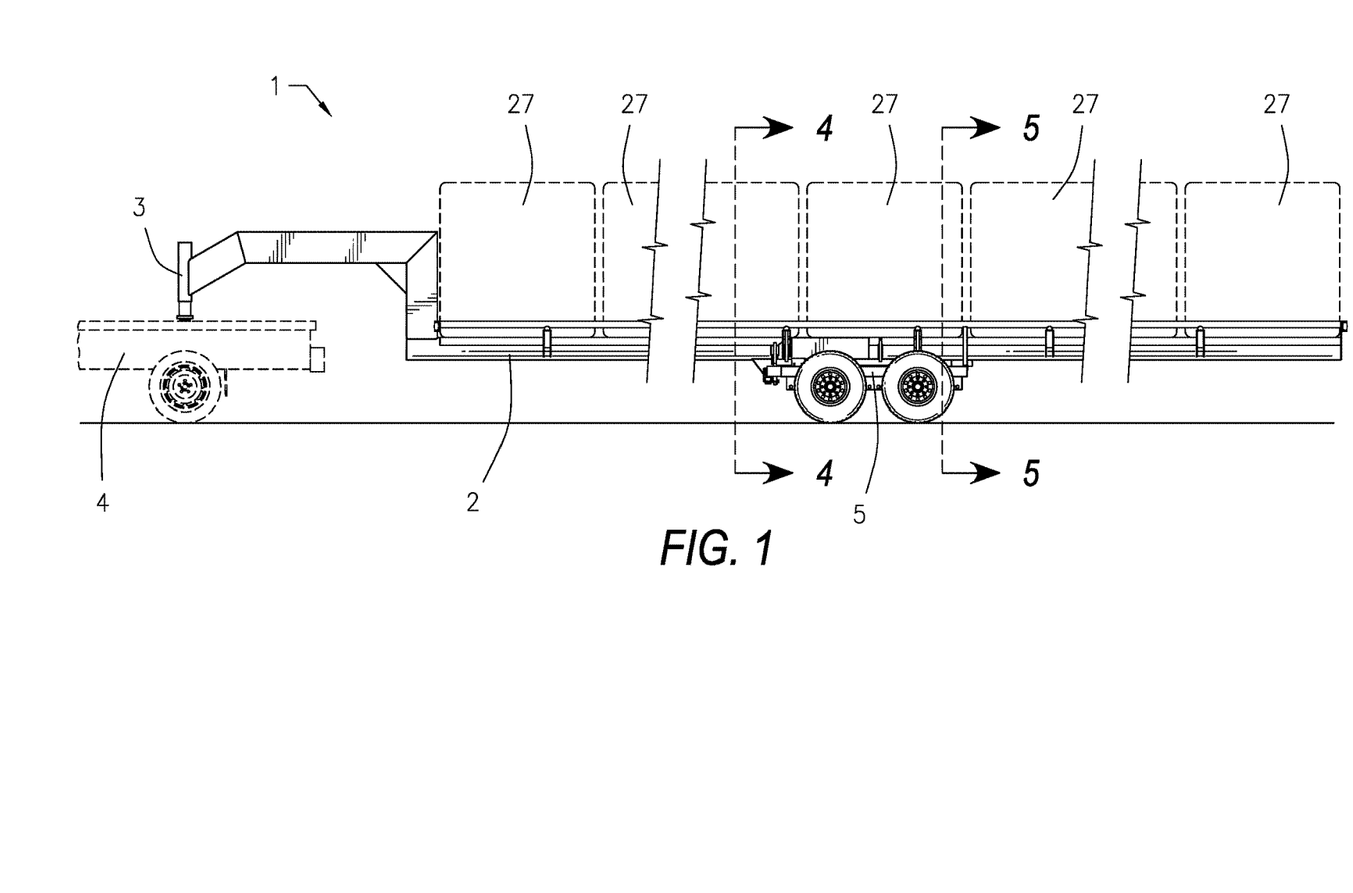
FIG. 1 is a side view of the hydraulic bale trailer of the present invention.
Figure 2:
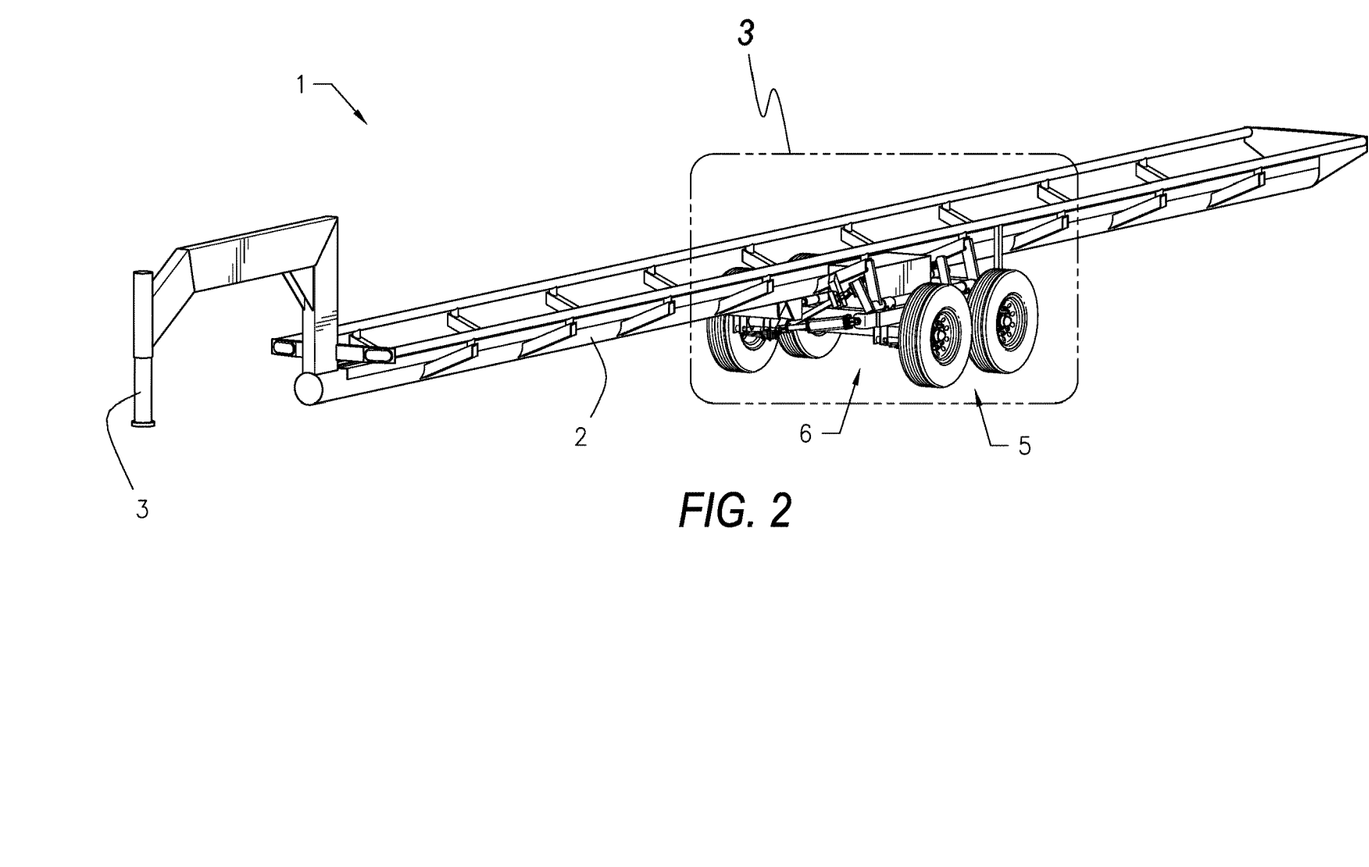
FIG. 2 is a perspective view of the hydraulic bale trailer.
Figure 3:
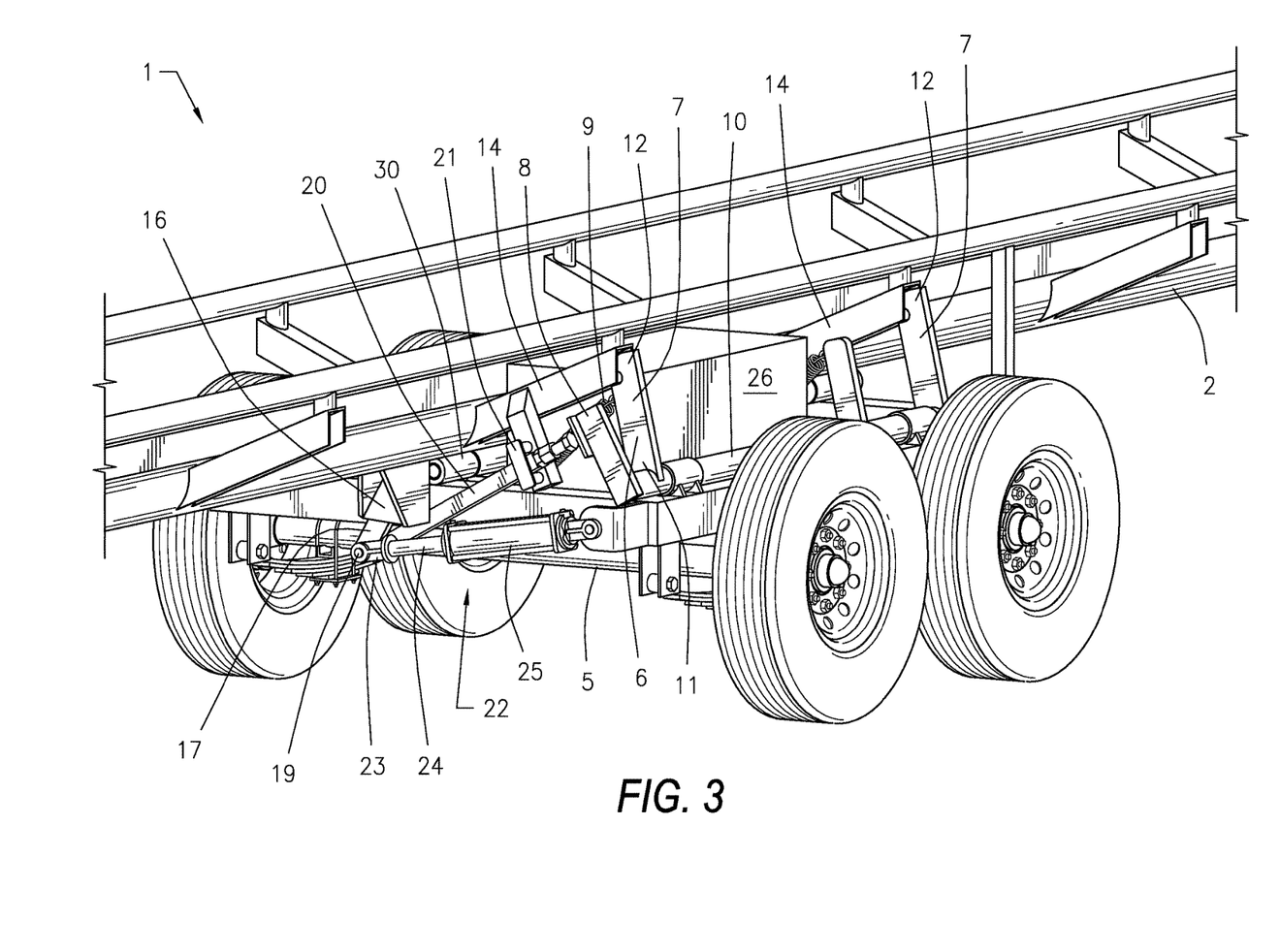
FIG. 3 is a close up perspective view of the lock assembly and hydraulic assembly of the hydraulic bale trailer.
Figure 4A:
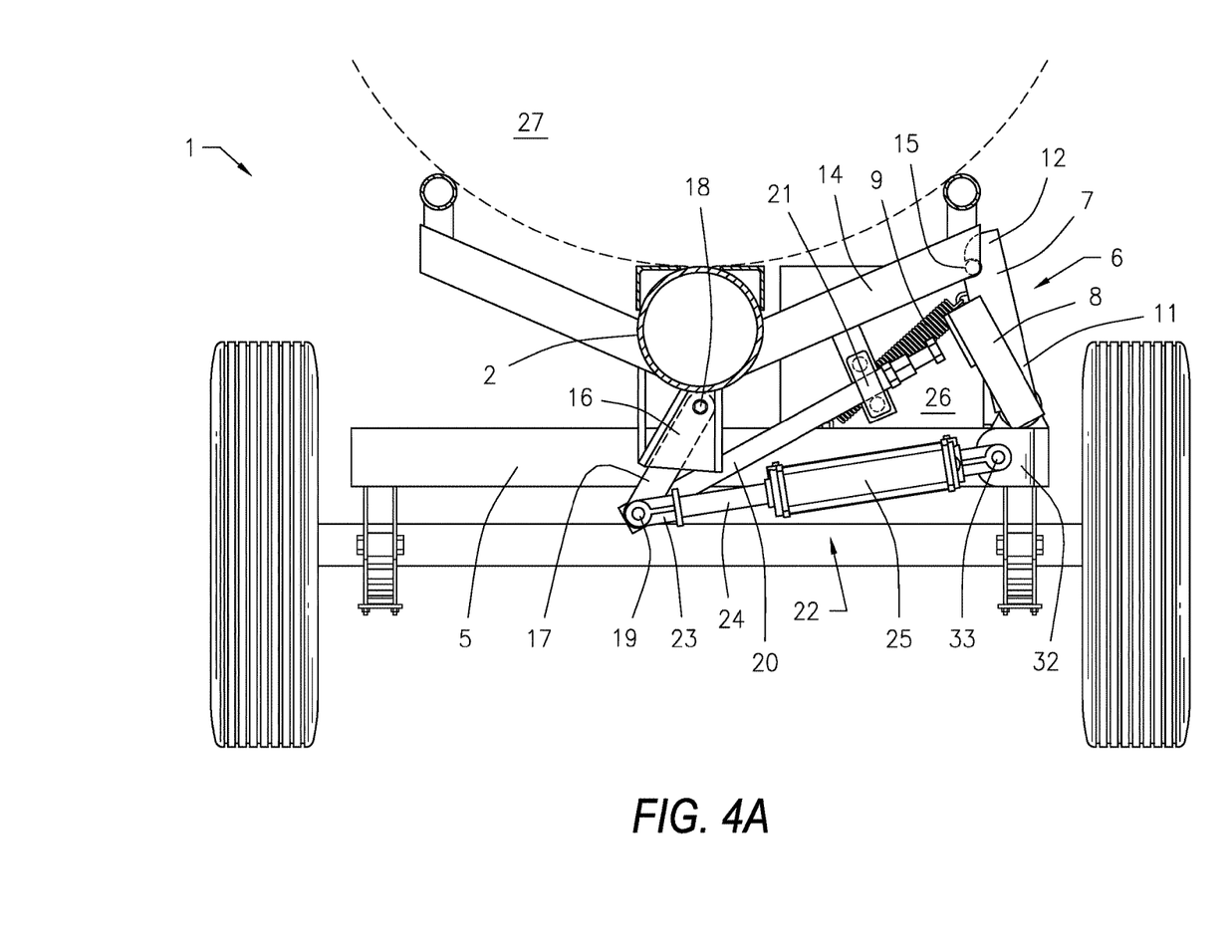
FIG. 4A is a front sectional view of the lock assembly and hydraulic assembly in a locked position with the frame upright and bale in place.
Figure 6:
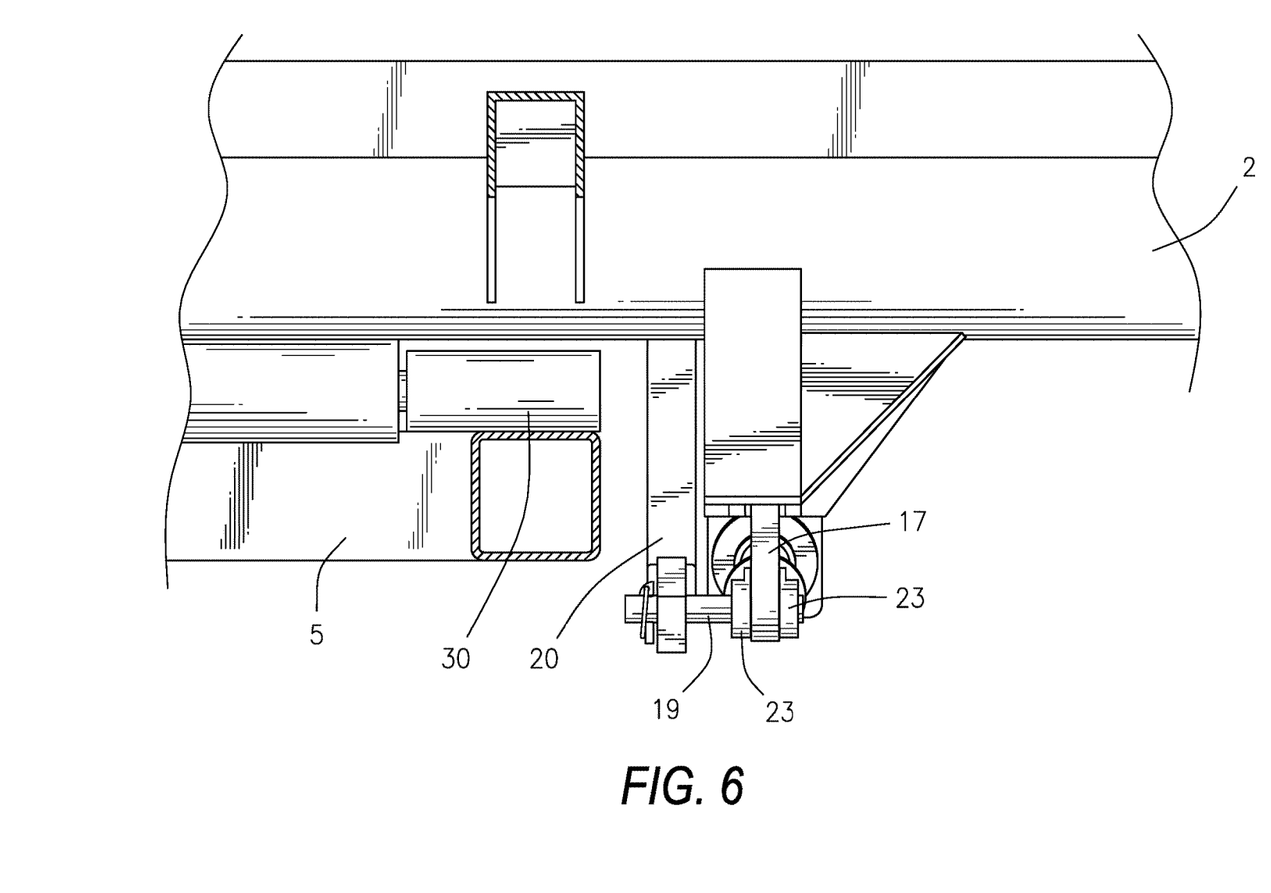
FIG. 6 is a side view of the lock assembly and hydraulic assembly of the hydraulic bale trailer.

One or more lock assemblies 6 may be attached to the axle caddy 5. The lock assembly 6 may comprise one or more posts 7, a paddle 8, and one or more lock springs 9. The posts 7 may be pivotally attached to the axle caddy 5 such that they may pivot toward and away from the frame 2. The posts 7 may be mounted near the edge of the axle caddy 5, nearer the wheels than the center thereof If there are multiple posts 7, all posts 7 may be connected to each other such that they pivot simultaneously. For example, the posts 7 may connect to the axle caddy 5 via a shared pivoting connector 10 such that all posts 7 pivot at the same time and to the same degree. Each post 7 may be generally elongate and may extend generally upward from the axle caddy 5 from a first end 11. Each post 7 may attach to the pivoting connector 10 at the first end 11. Each post 7 may have an opposed second end 12 and a notch 13 located at or near the opposed second end 12. The notch 13 may be located on the side of the post 7 nearer the frame 2, as opposed to the outward side of the post 7. Each post 7 may have a generally rectangular cross section, as shown, or may have any other desired shape.

The paddle 8 may be connected to the post 7 and may likewise pivot relative to the axle caddy 5, such that pushing the paddle 8 pivots the post 7. For example, the paddle 8 may connect to the pivoting connector 10, as shown, such that pivoting the paddle 8 causes all of the posts 7 to simultaneously pivot. The paddle 8 may have a flat face lying parallel to the long axis of the frame 2.

Each post 7 may be further connected to the axle caddy 5 via a lock spring 9. The lock spring 9 may connect at one end to the post 7 nearer the opposed second end 12 than the first end 11 and at its other end to the axle caddy 5 at a point nearer the center thereof than the post 7. The lock spring 9 may lie in a plane generally perpendicular to the long axis of the frame 2, such that pivoting the post 7 away from the frame 2 stretches the lock spring 9. The lock spring 9 may be generally rigid when in a non-stretched position, such that the lock spring 9 is capable of stopping the forward movement of the post 7 nearer the frame 2. Thus, the lock spring 9 maintains the post 7 in an engaged position when the lock spring 9 is in a non-stretched position, and returns the post 7 back to the engaged position when the post 7 is pivoted away from the frame 2 and the lock spring 9 is stretched.

When in the engaged position, the post 7 may angle toward the frame 2, with the notch 13 facing somewhat downward.

Figure 4B:
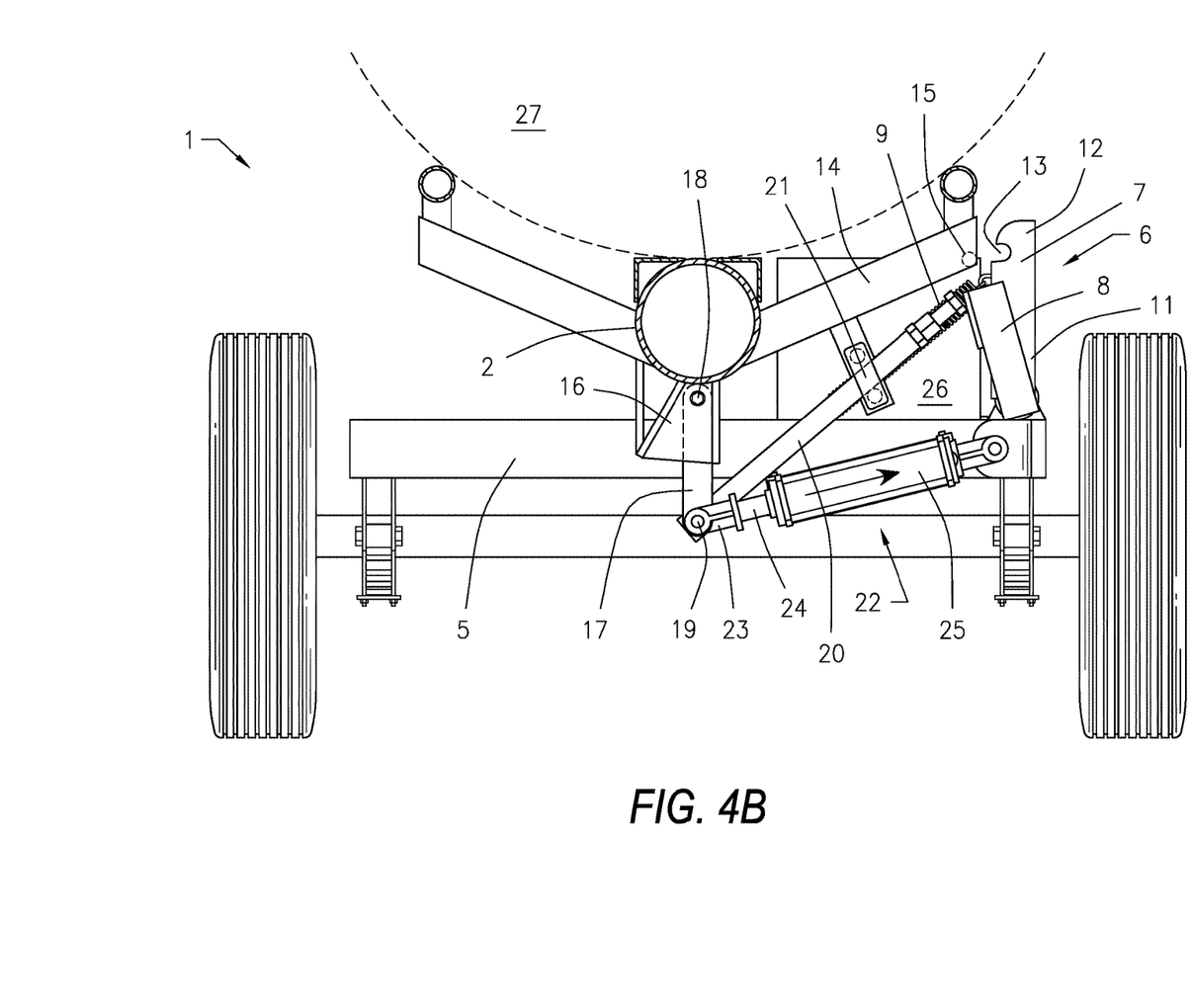
FIG. 4B is a front sectional view of the lock assembly and hydraulic assembly immediately after unlocking.

An arm 14 may extend outward from the frame 2 toward the second end 12 of the post 7. The arm 14 may terminate in a horizontal cross piece 15, which may be sized and shaped to fit within the notch 13 in the second end 12 of the post 7. All elements may be positioned such that the horizontal cross piece 15 fits within the notch 13 when the frame 2 is upright and the post 7 is in the engaged position, or in other words when the trailer 1 is in a locked position. When the trailer 1 is in the locked position, the arrangement of parts may prevent the frame 2 from tipping, keeping the bales within the frame. Specifically, the post 7 may prevent the arm 14 from traveling upward, as it must do for the frame 2 to pivot. If the paddle 8 is pushed, the post 7 may pivot away from the frame 2, disengaging the notch 13 from the horizontal cross piece 15 and allowing the frame 2 to pivot.

A pendulum box 16 may extend downward from the underside of the frame 2. A pendulum 17 may be pivotally mounted therein, such as on a pendulum top mount bolt 18, as shown, or otherwise as desired. The pendulum 17 may pivot freely within the pendulum box 16 along a plane lying perpendicular to the long axis of the frame 2. A pin 19 may extend through the end of the pendulum 17, as shown. An unlock arm 20 may mount to the pin 19 such that the unlock arm 20 may pivot relative to the pendulum 17. The unlock arm 20 may likewise lie in a plane perpendicular to the long axis of the frame 2. A bracket 21 may extend downward from the arm 14, and the unlock arm 20 may extend through the bracket 21 such that the bracket 21 holds the unlock arm 20 in an upward-angled position but allows axial movement of the unlock arm 20 through the bracket 21. The unlock arm 20 may be aligned with the paddle 8 such that the end of the unlock arm 20 is capable of pressing the paddle 8.

A hydraulic cylinder 22 may be pivotally mounted on one end on the pin 19 and on its other end to the axle caddy 5. The hydraulic cylinder 22 may comprise a hydraulic mount 23, a piston rod 24, a housing 25, and a hydraulic pump 26. The hydraulic mount 23 may straddle the end of the pendulum 17, with the pin 19 passing therethrough to pivotally attach the pendulum 17 and the hydraulic mount 23. The housing 25 may be mounted to the axle caddy 5 via a cylinder mount 32 and cylinder pin 33, and the piston rod 24 may be attached at one end to the hydraulic mount 23 with its other end housed within the housing 25. The hydraulic pump 26 may be mounted elsewhere on the axle caddy 5, but may be in fluid communication with the housing 25 such that the piston rod 24 may reciprocate therein. The hydraulic pump 26 may be run to the truck or other vehicle 4. The hydraulic cylinder 22 alternately may be an electronic actuator.

Figure 4C:
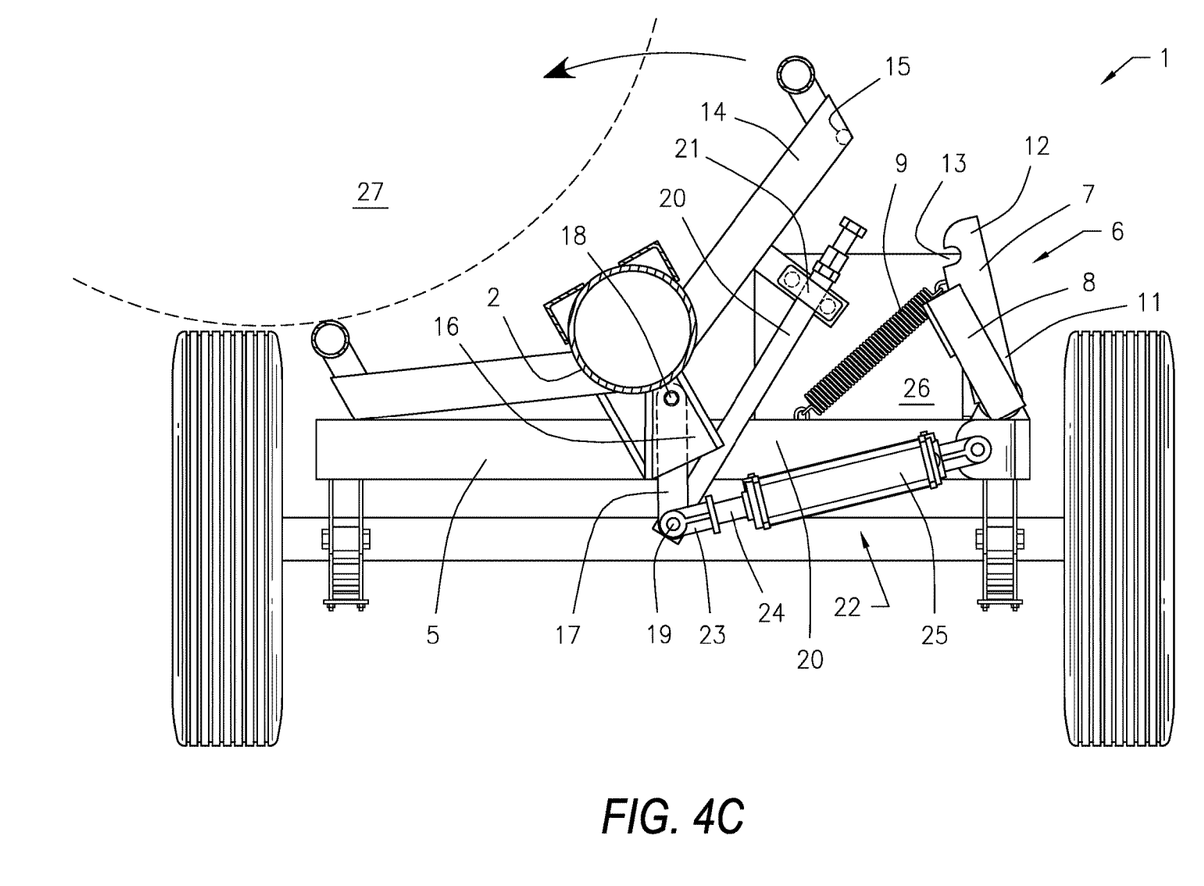
FIG. 4C is a front sectional view of the lock assembly and hydraulic assembly in the process of dumping the bale.

During use, the bale trailer 1 may begin in the locked position, with the frame 2 in the upright position with bales 27 held therein. The lock assembly 6 may be engaged, with the posts 7 angling toward the frame 2 and the horizontal cross pieces 15 of the arms 14 held within the notches 13 in the posts 7, preventing the frame 2 from tipping. The piston rod 24 may be extended, holding back the pendulum 17, and consequently the unlock arm 20, such that the end of the unlock arm 20 is not in contact with the paddle 8. When the hydraulic cylinder 22 is engaged, the piston rod 24 may be retraced into the housing 25. As the piston rod 24 retracts, it may pull the hydraulic mount 23 toward the housing 25, causing the pin 19, and consequently the pendulum 17 and the end of the unlock arm 20 mounted thereon, to also move. This movement may cause the unlock arm 20 to move toward the paddle 8, eventually pushing against the paddle 8. Pushing the paddle 8 may cause the posts 7 to pivot away from the frame 2, which may cause the lock assembly 6 to disengage, freeing the horizontal cross pieces 15 from the notches 13 and placing the bale trailer in the unlocked position. With the arm 14 no longer held in place, the frame 2 may be free to tip sideways, allowing the bales 27 to fall out of the frame 2. This tipping may occur with no further prompting due to the weight of the bales 27, particularly if the center of gravity of the frame 2 is off center. Once the tipping begins, the momentum of the bales 27 may accelerate the tipping and allow the bales 27 to be kicked out. The play in the mechanism may allow such movement, as opposed to a system wherein hydraulics directly act on a frame. In such systems, the hydraulics reduce the momentum and must necessarily fully extend to offload bales therefrom. The present invention, however, allows the bales 27 to offload sooner in the hydraulic cycle without the need to fully retract the piston rod 24. Specifically, the distance between the sides of the pendulum box 16 may allow the frame 2 to move freely when dumping, without hitting the pendulum 17.

Figure 4D:
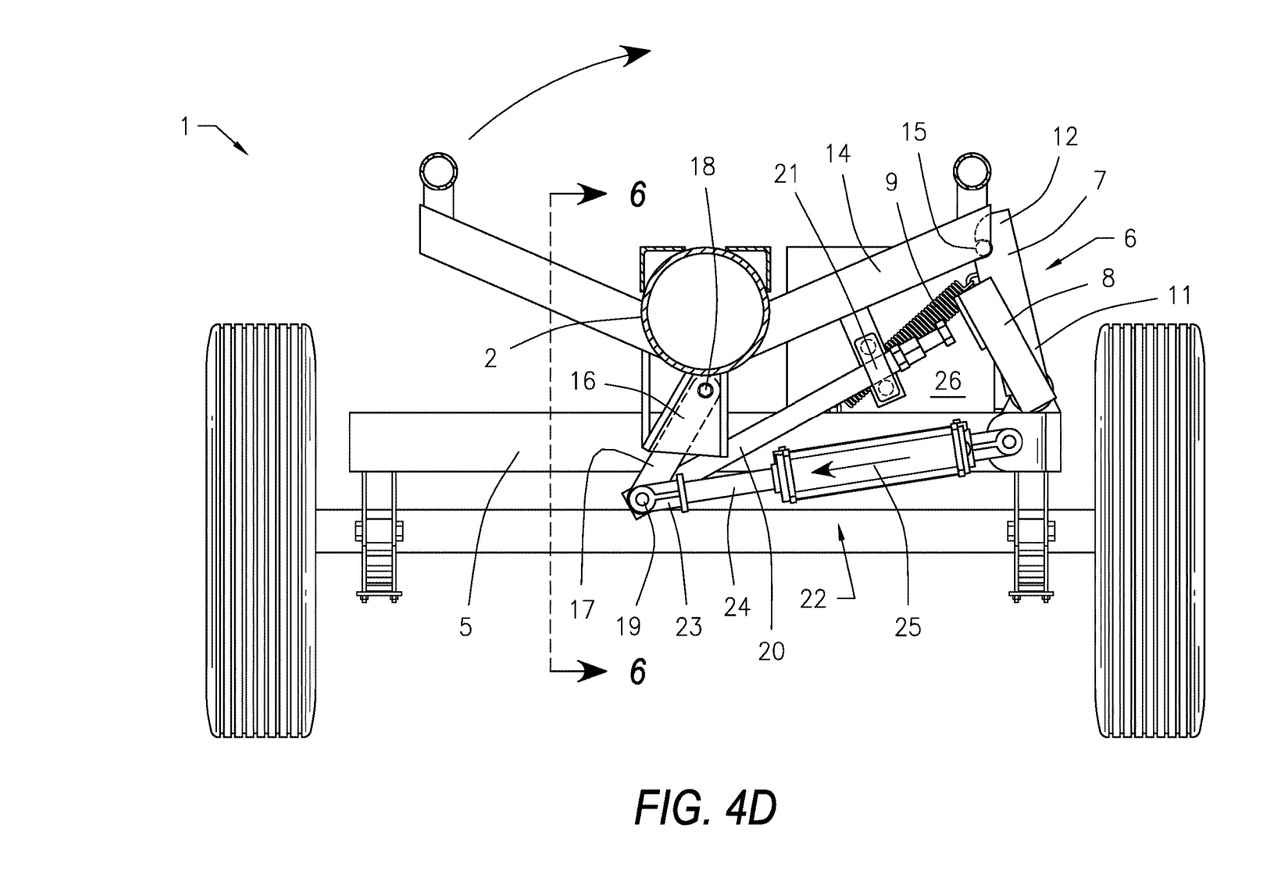
FIG. 4D is a front sectional view of the lock assembly and hydraulic assembly after dumping the bale and returning to the locked position.
Figure 5A:
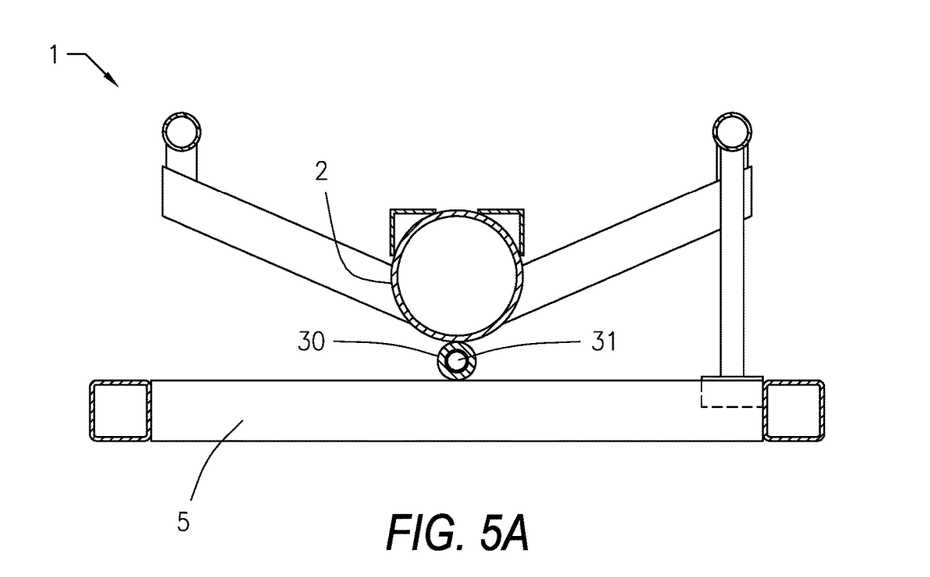
FIG. 5A is a front sectional view of the frame in an upright position, showing the pivot point.
Figure 5B:
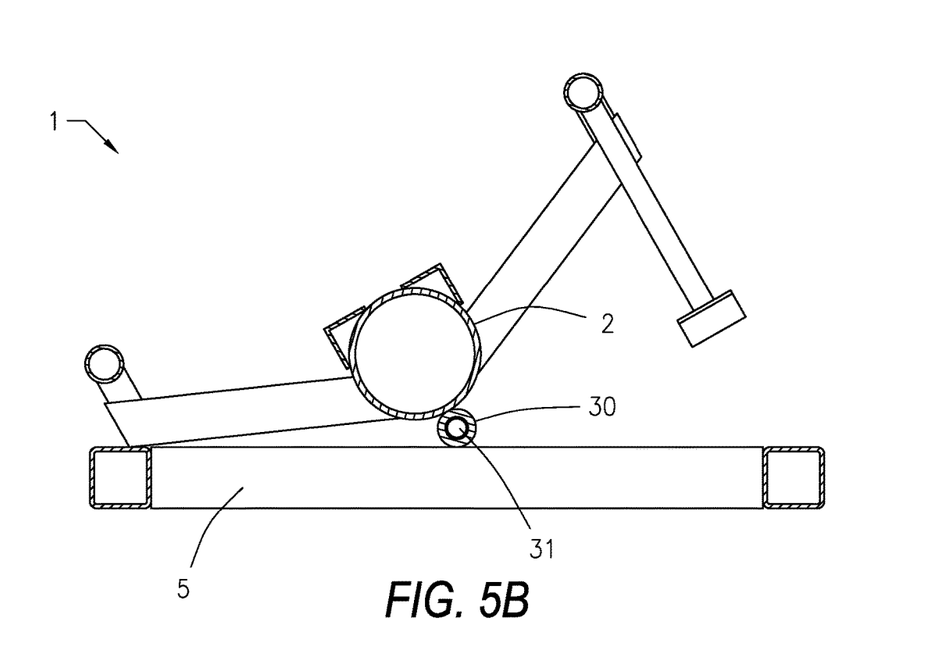
FIG. 5B is a front sectional view of the frame in a tilted position, showing the pivot point.

If the frame 2 does not tip immediately after the lock assembly 6 is disengaged, such as if the bale trailer 1 is on uneven ground and the tipping must occur uphill or the center of gravity of the frame 2 is otherwise not in a direction that allows immediate tipping, the hydraulic cylinder 22 may continue retracting, eventually pushing the pendulum 17 against the side of the pendulum box 16, causing the frame 2 to pivot and the bales 27 to tip out. Once the bales 27 have fallen out of the frame 2, the motion of the hydraulic cylinder 6 may be reversed, with the piston rod 24 again extending and pulling the unlock arm 20 away from the paddle 8. The lock springs 9 may then encourage the posts 7 to return to the engaged position. The pendulum 17 may push against the opposite side of the pendulum box 16, causing the frame 2 to return to its upright position, allowing the notches 13 in the posts 7 to again engage the horizontal cross pieces 15. The bale trailer 1 may thus return to the locked position.

The bale trailer 1 may be manufactured with any or all elements described herein included. Alternately, the lock assembly 6 and/or the hydraulic assembly described herein may be retrofitted to an existing manual bale trailer.

Whereas, the devices and methods have been described in relation to the drawings and claims, it should be understood that other and further modifications, apart from those shown or suggested herein, may be made within the spirit and scope of this invention.

What is claimed is:

1. A hydraulic bale trailer comprising:
a frame, where the frame is elongate and has a long axis;
an axle caddy, where the frame is connected to the axle caddy such that the frame is capable of tilting on its long axis;
a lock assembly connected to the axle caddy such that the lock assembly is capable of preventing the frame from tilting when the lock assembly is in an engaged position;
a hydraulic assembly with a first end and a second end, where the first end is connected to the frame and the second end is connected to the axle caddy and where the hydraulic assembly is capable of releasing the lock assembly from the engaged position to a disengaged position, allowing the frame to tilt; and
a pendulum assembly, where the first end of the hydraulic assembly is connected to the frame via the pendulum assembly and where the pendulum assembly comprises:
a pendulum box extending downward from the frame; and
a pendulum pivotally mounted within the pendulum box such that the pendulum is capable of pivoting freely within the pendulum box along a plane lying perpendicular to the long axis of the frame, where the first end of the hydraulic assembly is pivotally connected to a distal end of the pendulum such that actuating the hydraulic assembly causes the pendulum to pivot within the pendulum box.

2. The hydraulic bale trailer of claim 1 where the hydraulic assembly comprises:
a hydraulic mount pivotally connected to the distal end of the pendulum;
a piston rod connected to the hydraulic mount; and
a housing mounted to the axle caddy, where the piston rod is capable of reciprocating within the housing such that extending the piston rod pushes the pendulum toward a first side of the pendulum box and retracting the piston rod pulls the pendulum toward an opposed second side of the pendulum box.

3. The hydraulic bale trailer of claim 1 further comprising an unlock arm, where the unlock arm is elongate and comprises:
a first end pivotally connected to the distal end of the pendulum and the first end of the hydraulic assembly;
a center supported by a bracket extending downward from the frame such that the bracket supports the unlock arm in an upward-angled position but allows axial movement of the unlock arm through the bracket; and
a second end;
where the unlock arm lies in a plane perpendicular to the long axis of the frame and is aligned with the lock assembly such that the unlock arm is capable of unlocking the unlock assembly.

4. The hydraulic bale trailer of claim 3 where the lock assembly comprises:
a post extending generally upward from and pivotally connected to the axle caddy such that the post is capable of pivoting toward or away from the frame;
a notch in a distal end of the post;
a paddle connected to the post such that pushing the paddle pivots the post away from the frame;
a lock spring with a first end connected to the post and a second end connected to the axle caddy, where the lock spring lies in a plane generally perpendicular to the long axis of the frame such that pivoting the post away from the frame stretches the lock spring;
an arm extending outward from the frame toward the post; and
a cross piece at a distal end of the arm, where the cross piece fits within the notch when the spring is not stretched such that the post prevents the frame from tilting when the lock assembly is in the engaged position;
such that pressing the paddle pivots the post away from the frame and consequently releases the cross piece from the notch, allowing the frame to tilt; and
where the second end of the unlock arm is positioned such that it is capable of pressing the paddle and moving the lock assembly from the engaged position to the disengaged position when the hydraulic assembly is retracted.

5. A hydraulic assembly for use on a bale trailer comprising a frame, where the frame is elongate and has a long axis; an axle caddy, where the frame is connected to the axle caddy such that the frame is capable of tilting on its long axis; and a lock assembly connected to the axle caddy such that the lock assembly is capable of preventing the frame from tilting when the lock assembly is in an engaged position; the hydraulic assembly comprising:
- a first end connected to the frame;
- a second end connected to the axle caddy; and
- a pendulum assembly, where the first end of the hydraulic assembly is connected to the frame via the pendulum assembly and where the pendulum assembly comprises:
  - a pendulum box extending downward from the frame; and
  - a pendulum pivotally mounted within the pendulum box such that the pendulum is capable of pivoting freely within the pendulum box along a plane lying perpendicular to the long axis of the frame, where the first end of the hydraulic assembly is pivotally connected to a distal end of the pendulum such that actuating the hydraulic assembly causes the pendulum to pivot within the pendulum box;

where the hydraulic assembly is capable of releasing the lock assembly from the engaged position to a disengaged position, allowing the frame to tilt.

6. The hydraulic assembly of claim 5 further comprising:
- a hydraulic mount pivotally connected to the distal end of the pendulum;
- a piston rod connected to the hydraulic mount; and
- a housing mounted to the axle caddy, where the piston rod is capable of reciprocating within the housing such that extending the piston rod pushes the pendulum toward a first side of the pendulum box and retracting the piston rod pulls the pendulum toward an opposed second side of the pendulum box.

7. The hydraulic assembly of claim 5 further comprising an unlock arm, where the unlock arm is elongate and comprises:
- a first end pivotally connected to the distal end of the pendulum and the first end of the hydraulic assembly;
- a center supported by a bracket extending downward from the frame such that the bracket supports the unlock arm in an upward-angled position but allows axial movement of the unlock arm through the bracket; and
- a second end;

where the unlock arm lies in a plane perpendicular to the long axis of the frame and is aligned with the lock assembly such that the unlock arm is capable of unlocking the unlock assembly.

8. The hydraulic assembly of claim 7 further comprising a paddle connected to the lock assembly such that pressing the paddle disengages the lock assembly, where the second end of the unlock arm is positioned such that it is capable of pressing the paddle and disengaging the lock assembly when the hydraulic assembly is retracted.

* * * * *